United States Patent
Ridgway

(10) Patent No.: US 12,466,448 B1
(45) Date of Patent: Nov. 11, 2025

(54) RAILROAD TANK CAR MANWAY NOZZLE ASSEMBLY GASKET

(71) Applicant: MPRC PRODUCTS LLC, Cedar Rapids, IA (US)

(72) Inventor: Robert Ridgway, Northbrook, IL (US)

(73) Assignee: MPRC Products LLC, Cedar Rapids, IA (US)

( * ) Notice: Subject to any disclaimer, the term of this patent is extended or adjusted under 35 U.S.C. 154(b) by 1082 days.

(21) Appl. No.: 17/392,771

(22) Filed: Aug. 3, 2021

(51) Int. Cl.
*B61D 5/00* (2006.01)
*B65D 90/00* (2006.01)
*F16J 15/3268* (2016.01)
*F16J 15/3284* (2016.01)

(52) U.S. Cl.
CPC ............ *B61D 5/08* (2013.01); *F16J 15/3268* (2013.01); *F16J 15/3284* (2013.01)

(58) Field of Classification Search
CPC ....... B61D 5/08; F16J 15/3268; F16J 15/3284
See application file for complete search history.

(56) References Cited

U.S. PATENT DOCUMENTS

| | | | | |
|---|---|---|---|---|
| 3,126,591 A | * | 3/1964 | Hamilton | E06B 7/2318 105/377.08 |
| 3,401,647 A | * | 9/1968 | Ingram | E06B 7/2318 105/377.08 |
| 5,518,033 A | * | 5/1996 | Webster | F16L 55/11 138/92 |
| 6,050,199 A | * | 4/2000 | Anderson | B61D 17/16 105/377.07 |
| 6,076,471 A | * | 6/2000 | Burian | B65D 90/36 105/377.07 |
| 6,532,877 B1 | * | 3/2003 | Hepburn | B61D 17/12 105/377.08 |
| 8,166,891 B2 | * | 5/2012 | Borowski | B61D 5/08 105/377.07 |
| 8,196,523 B2 | * | 6/2012 | Blevins, Jr. | B61D 5/08 105/377.07 |
| 8,656,840 B2 | * | 2/2014 | Borowski | B61D 5/08 105/377.07 |
| 9,637,142 B2 | * | 5/2017 | Reiling | B61D 5/08 |
| 9,944,459 B2 | * | 4/2018 | Benet | B65D 90/10 |
| 10,703,389 B2 | * | 7/2020 | Dzolovic | F16J 13/18 |
| 2010/0282124 A1 | * | 11/2010 | Blevins, Jr. | B61D 5/08 105/377.08 |
| 2015/0329284 A1 | * | 11/2015 | Benet | B65D 53/02 220/378 |
| 2018/0273055 A1 | * | 9/2018 | Dzolovic | F16J 15/104 |

* cited by examiner

*Primary Examiner* — Robert J McCarry, Jr.
(74) *Attorney, Agent, or Firm* — Vedder Price P.C.

(57) ABSTRACT

A gasket placed on a railroad tank car manway nozzle to extend the gasket's sealing integrity, durability and life. The gasket comprises an external gasket extension, a sealing surface contact portion, an internal gasket extension and a plurality of tabs on the external gasket extension. The sealing surface contact portion includes an enlarged mass portion which gets flattened under compression and extends linearly to provide an additional sealing force along the interior wall of the manway nozzle. The internal gasket extension includes a ring portion which serves as an internal splash guard. In use, the existing manway cover plate assembly is unbolted, the existing nozzle gasket removed and replaced by a new gasket as disclosed herein, and then the cover plate is bolted and torqued down to the nozzle.

15 Claims, 7 Drawing Sheets

RAILROAD TANK CAR MANWAY NOZZLE ASSEMBLY GASKET

TECHNICAL FIELD

The exemplary teachings herein pertain to railroad tank car manway nozzle assembly gaskets. Specifically, the present disclosure relates to a railroad tank car manway nozzle assembly gasket with dimensional and material specifications providing for operational safety, durability and reliability in the rail industry, incorporated to prevent leakage, spillage and exposure to the fluids being transported.

BACKGROUND

Many variants of railroad tank cars exist due to the wide variety of liquids and gases transported. Tank cars can be pressurized or non-pressurized, insulated or non-insulated, and designed for single or multiple commodities. Non-pressurized cars have various fittings on the top and may have fittings on the bottom. Some of the top fittings are covered by a protective housing. Pressurized cars have a pressure plate, with all fittings, and a cylindrical protective housing (dome) at the top. Loading and unloading are done through this protective housing designated as the manway nozzle and cover plate, which includes a sealing gasket to prevent spillage.

In rail transport, the U.S. DOT-111 tank car, also known as the TC-111 in Canada, is a type of unpressurized general service tank car in common use in North America. Tank cars built to this specification must be circular in cross section, with elliptical, formed heads set convex outward. They have a minimum plate thickness of 7/16 inch (11.1 mm) and a maximum capacity of 34,500 US gallons (131,000 L; 28,700 imp gal). Tanks may be constructed from carbon steel, aluminum alloy, high alloy steel, or nickel plate steel. See prior art FIG. 1 (Diagram of a DOT-1111100W1 tank car with an insulating jacket and external beating coils. It has a capacity of 20,000 US gallons (76,000 L; 17,000 imp gal).). https://en.wikipedia.org/wiki/DOT-11 tank car. The railroad tank car protective dome arrangement consists of a raised manway nozzle extension and a protective cover plate within the dome, and a nozzle gasket assembly between the two.

Railroad tank cars that carry various commodity fluids, such as petroleum products, ethanol, vegetable oil, and milk to name a few, are subject to leakage, spillage and potential exposure of the fluid especially in the area of the manway nozzle, the cover plate and the manway gasket located in the tank car's dome arrangement. Physical and chemical failure of the manway gaskets is a significant source of leaks on railroad tank cars resulting in potential environmental hazard incidents, possible fluid contamination and loss of product. See prior art FIGS. 2A and 2B (Pictures of gasket failure/fluid leak).

The tank car construction and safety specifications are provided in the Code of Federal Regulations, Title 49 Part 179.1 thru 179.500-18, Specifications for tank cars. The manway nozzle, cover and protective housing specifications are found in Part 179.100-12, which states as follows:

49CFR § 179.100-12 Manway nozzle, cover and protective housing.

(a) Manway nozzles must be of approved design of forged or rolled steel for steel tanks or of fabricated aluminum alloy for aluminum tanks, with an access opening of at least 18 inches inside diameter, or at least 14 inches by 18 inches around or oval. Each nozzle must be welded to the tank and the opening reinforced in an approved manner in compliance with the requirements of AAR Specifications for Tank Cars, appendix E, Figure E10 (IBR, see § 171.7 of this subchapter).

(b) Manway covers shall be machined to approved dimensions and be of forged or rolled carbon or alloy steel, rolled aluminum alloy or nickel when required by the lading. Minimum thickness is listed in § 179.101. Manway covers shall be attached to the manway nozzle by through or stud bolts not entering tank, except as provided in § 179.103-2(a).

(c) Except as provided in § 179.103, protective housing of cast, forged or fabricated approved materials must be bolted to manway cover with not less than twenty ¾-inch studs. The shearing value of the bolts attaching protective housing to manway cover must not exceed 70 percent of the shearing value of bolts attaching manway cover to manway nozzle. Housing must have steel sidewalls not less than three-fourths inch in thickness and must be equipped with a metal cover not less than one-fourth inch in thickness that can be securely closed. Housing cover must have suitable stop to prevent cover striking loading and unloading connections and be hinged on one side only with approved riveted pin or rod with nuts and cotters. Openings in wall of housing must be equipped with screw plugs or other closures.

Accordingly, as discussed on the webpage http://www.safetrack.com/tank-car-loading-and-unloading/, manway nozzle gaskets must be inspected for condition, compatibility with the material in the tank car. They should stay in place when manways are opened but shall be easily removed for replacement. If a manway nozzle gasket does not stay in place or gaps exist, it could be the wrong size and may slip out of position the manway cover is closed.

Inspect manway nozzle gasket surfaces and bolts for damaged or bent bolts, bad threads, or bad washers that would prevent the proper closure of the manway cover plate. If there is extensive dirt or rust on the bolts, use appropriate lubricant. Manway cover plate bolts most be tightened in a star pattern to ensure that the manway cover is evenly bolted down and the gasket has the proper seal.

All bolts must be tool tight when finished. When tightening manway cover bolts, use a torque wrench to achieve uniform tightness. Contact the car owner for proper manway torqueing values for the type of gasket being used.

The following prior art references provide general background information regarding railroad tank car manway nozzle assembly gaskets, and each are herein incorporated by reference:

U.S. Pat. No. 5,678,827 entitled Tank Car Manway Gasket, issued to Burian et al. on Oct. 21, 1997.

U.S. Pat. No. 6,824,140 entitled Manway Cover Gasket, issued to Frew et al. on Nov. 30, 2004.

U.S. Pat. No. 8,196,523 entitled Railroad Tanker Car Manway Cover Seal, issued to Blevins, Jr. on Jun. 12, 2012.

U.S. Pat. No. 8,656,840 entitled Manway Gasket, issued to Borowski et al. on Feb. 25, 2014.

U.S. Pat. No. 9,637,142 entitled Manway Gasket Compression Stop, issued to Reiling, et al. on May 2, 2017.

U.S. Pat. No. 9,944,459 entitled Manway Lid Gasket, issued to Benet et al. on Apr. 17, 2018.

U.S. Pat. No. 10,703,389 entitled Compression Limiting Manway Gasket, issued to Dzolovic et al. on Jul. 7, 2020.

U.S. Pat. No. 10,865,040 entitled Portable Tank, issued to Oltman et al. on Dec. 15, 2020.

The current rail tank car manway nozzle and cover plate assembly gaskets, as being reported (field complaints) by rail car machinists and operators, are prone to steadily increasing fluid leakage during the rail car service operation due to the following conditions: a) the gasket material composition and durometer is inadequate and substandard for the potential environmental hazards and surface sealing requirements, b) the gasket material composition and durometer is inadequate and substandard for the potential fluid exposure, contamination and purity requirements, and c) and the gasket's sealing/clamping contact surface profile and dimensions are lacking in providing the proper sealing, clamp loading and torque retention requirements necessary for the longer operating service life being expected by the rail industry, (overhaul to overhaul). In addition, (and consequently most field complaints), the gasket which typically located on the manway cover plate is extremely difficult to remove/replace and is not a required maintenance item, (bolt re-torque), by the rail carriers.

Therefore, a need exists for a railroad tank car manway nozzle assembly gasket which overcomes these and other disadvantages and shortcomings of prior art gaskets, and which prevents leakage, spillage and exposure of the fluids being transported. The exemplary teachings disclosed herein fulfill such a need, and provide other advantages over prior art gaskets.

SUMMARY

The disclosed railroad tank car manway nozzle assembly gasket comprises a gasket having a combination of material and design specifications that, when placed on the tank car manway nozzle, will extend the gasket's sealing integrity, durability and life until the next subsequential rail car overhaul occurs. At the time of overhaul, the existing manway cover plate assembly is unbolted, the existing nozzle gasket removed and consequently the cover plate is bolted and torqued down to the nozzle with a new gasket as disclosed herein.

The presently disclosed gasket comprises an external gasket extension, a sealing surface contact portion, an internal gasket extension and a plurality of tabs on the external gasket extension. The sealing surface contact portion includes an enlarged mass portion which gets flattened under compression and extends linearly to provide an additional sealing force along the interior wall of the manway nozzle. The internal gasket extension includes a ring portion which serves as an internal splash guard.

Accordingly, it is an object of the present disclosure to provide a gasket that prevents leakage, spillage and exposure of the fluids being transported in a railroad tank car.

It is another objective of the present disclosure to provide a gasket that provides an additional sealing force to the interior wall of the manway nozzle of a railroad tank car.

It is still another objective the p resent disclosure to provide a gasket having a splash guard about an interior wall of the manway nozzle of a railroad tank car.

Additional objectives, advantages and features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

DETAILED DESCRIPTION

The following description refers to numerous specific details which are set forth by way of examples to provide a thorough understanding of the relevant method(s), system(s) and device(s) disclosed herein. It should be apparent to those skilled in the art that the present disclosure may be practiced without such details. In other instances, well known methods, procedures, components and/or hardware have been described at a relatively high-level, without detail, in order to avoid unnecessarily obscuring aspects of the present disclosure. While the description refers by way of example to railroad tank car manway nozzle assembly gaskets and the installation and use thereof, it should be understood that the method(s), system(s) and device(s) described herein may be used in any situation where gaskets are needed or desired.

Figure 7A:
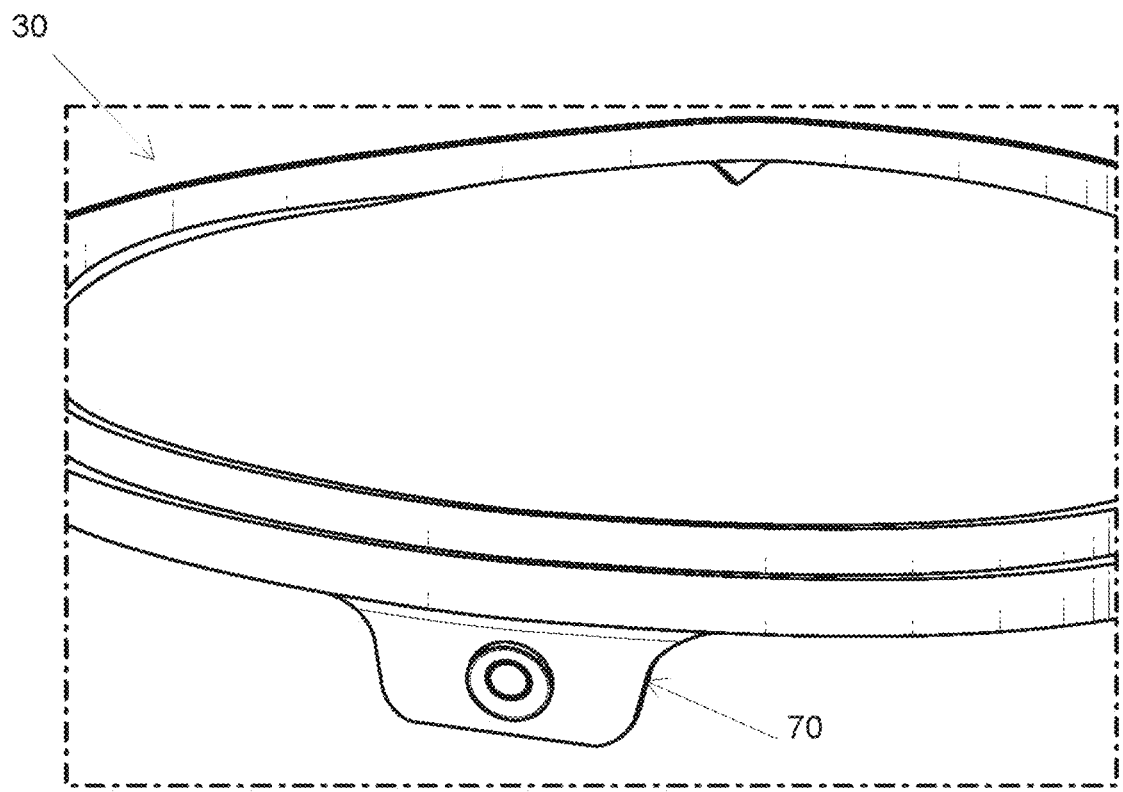
FIG. 7A is a front perspective view of the railroad tank car manway nozzle assembly gasket of the present disclosure, having a large tab with a grommet.
Figure 7B:
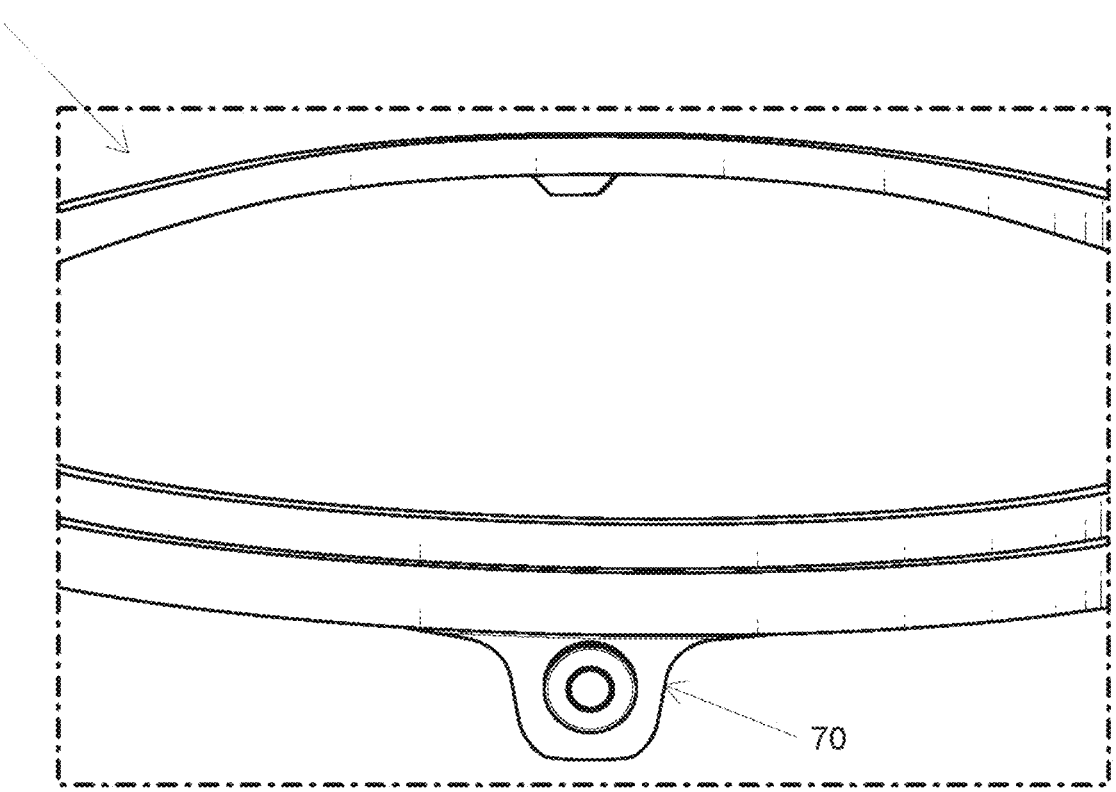
FIG. 7B is a front perspective view of the railroad tank car manway nozzle assembly gasket of the present disclosure, having a small tab with a grommet.

FIGS. 3, 4 and 5A-5B illustrate the railroad tank car manway nozzle assembly gasket of the present disclosure and its use. As can been seen in FIG. 3, the gasket 30 comprises the following components: the external gasket extension 40, the sealing surface contact portion 50, the internal gasket extension 60 and at least one tab 70 (four shown) on the external gasket extension 40. The tabs can assist in placement and/or removal of the gasket, as well as for providing an identification tag. The tabs can also be used as location to fasten the gasket, such as with a zip tie, to or through one of the bolting assemblies for added security. Optionally, the tabs may be fitted with a grommet (see FIGS. 7A and 7B), which will assist in this fastening process. Further, the tabs may be of different sizes. FIG. 7A illustrates a gasket having a large tab with a grommet. FIG. 7B illustrates a gasket having a small tab with a grommet.

The gasket 30 material composition and durometer can be of the Nitrile, EPDM, or Viton™ elastomeric composition with the appropriate durometer required for these materials and the fluid sealing application. For example, the gasket 30 may be made of black FDA Nitrile with an 80 durometer. By way of further example, the gasket 30 may also be made of blue EPDM with a 70 durometer. These gasket examples meet the demands of a high performance seal, suitable for sealing food sweeteners and/or ethanol and petroleum products.

Figure 1:
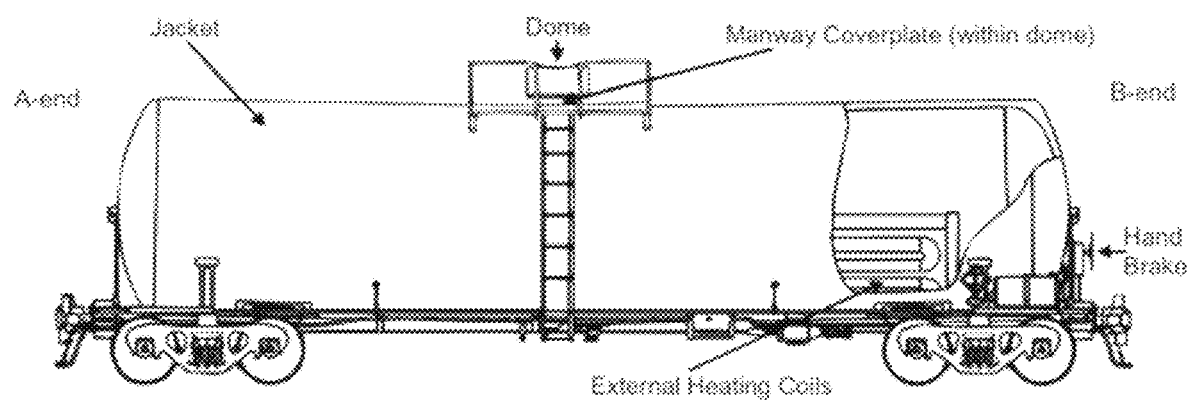
FIG. 1 is diagram of a prior art railroad tank car.
Figure 2A:
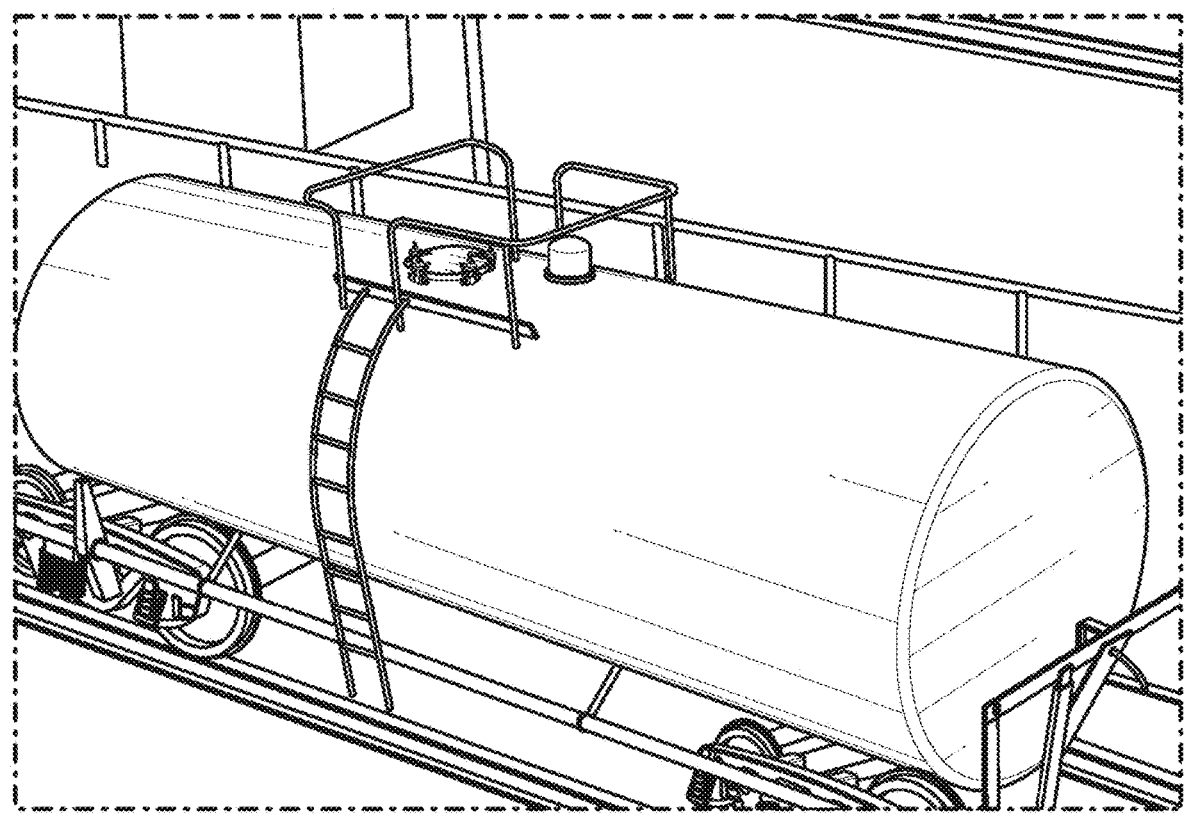
FIGS. 2A and 2B are pictures illustrating the failure of a prior art gasket on a railroad tank car.
Figure 2B:
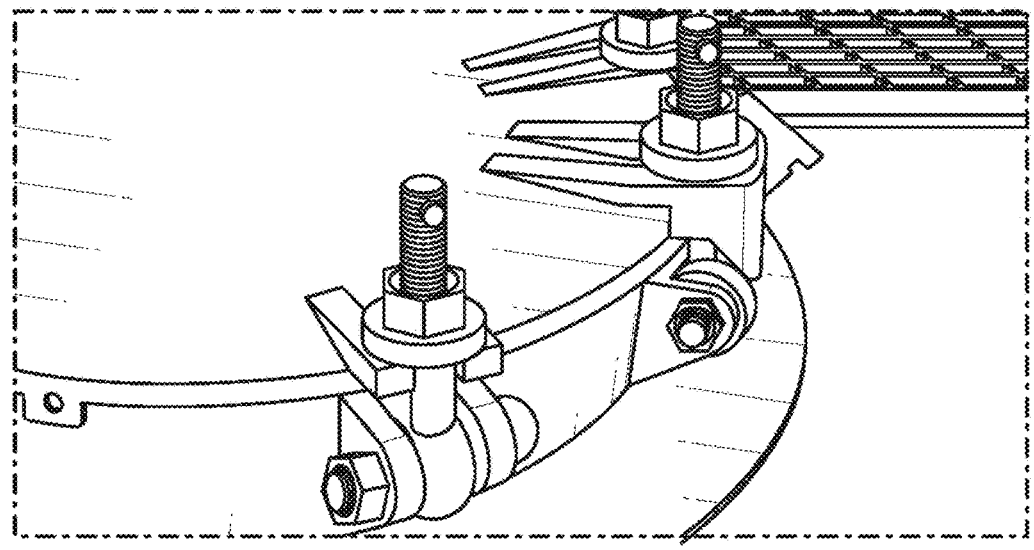
Figure 3:
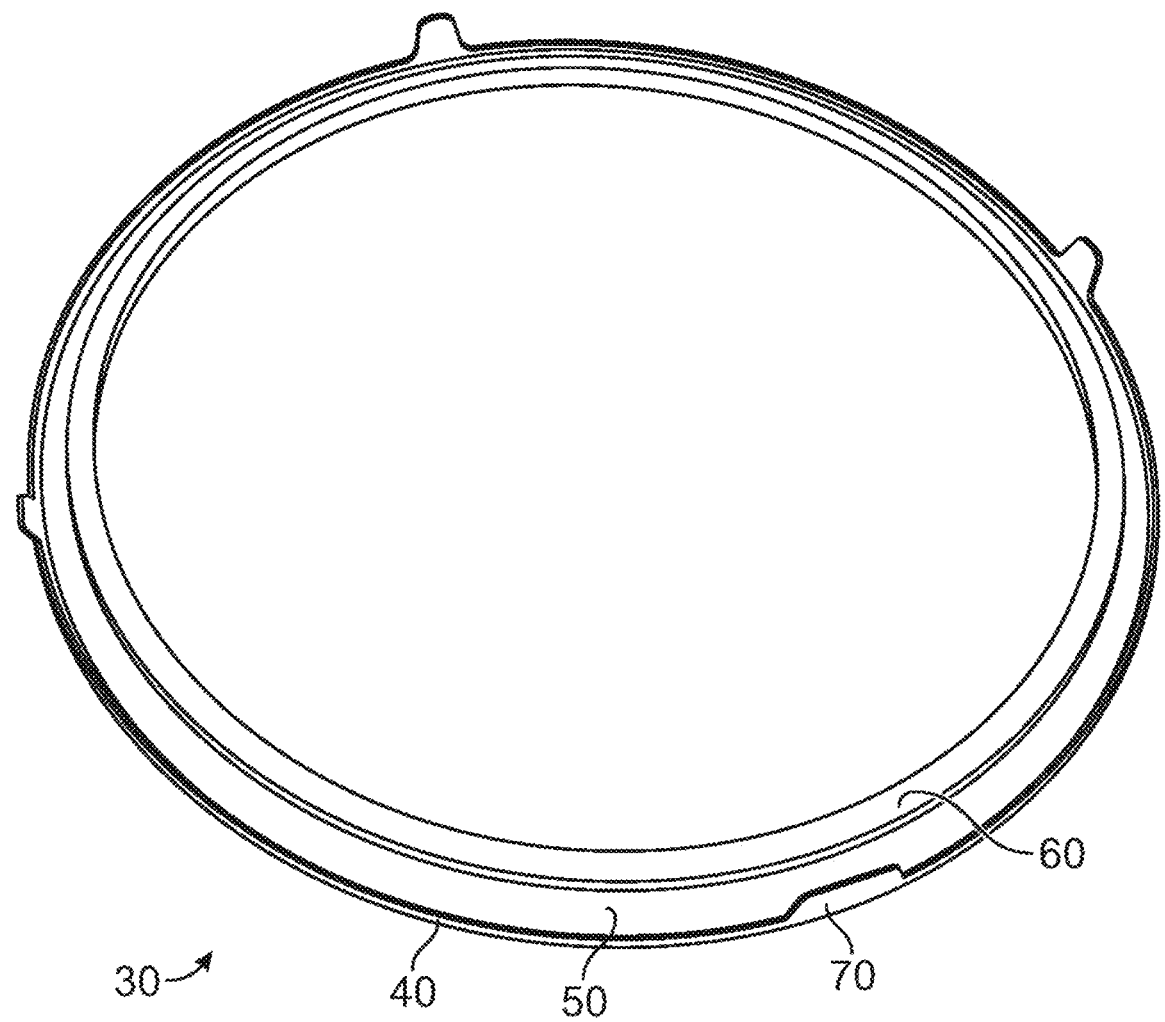
FIG. 3 is a bottom perspective view of the railroad tank car manway nozzle assembly gasket of the present disclosure.
Figure 4:
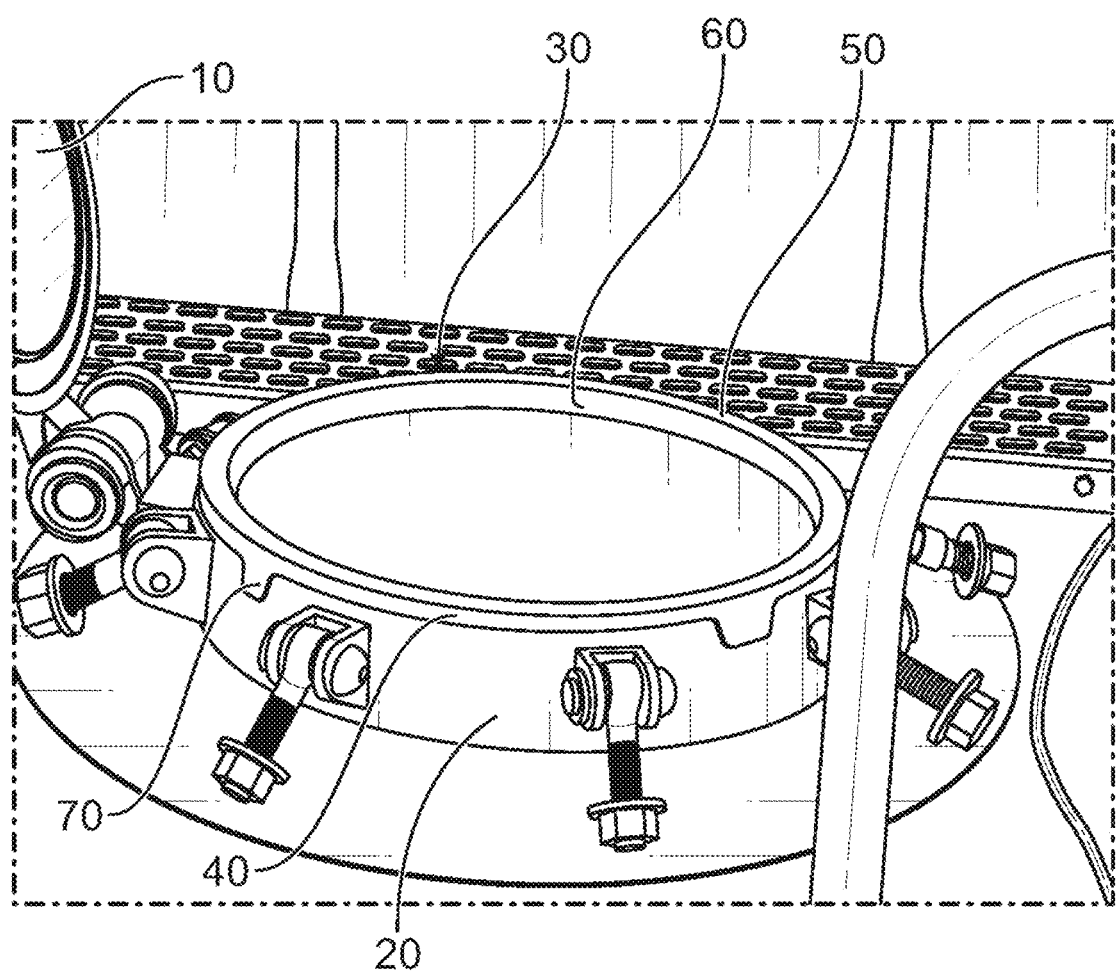
FIG. 4 is a top perspective view of the railroad tank car manway nozzle assembly gasket of the present disclosure in place on a railroad tank car manway nozzle.

FIG. 4 illustrates the gasket 30 placed on a manway nozzle extension 20. The opened manway cover plate 10 can also been seen in FIG. 4. As shown in FIG. 4, the gasket 30 is placed onto the top edge of the manway nozzle extension 20, such that the external gasket extension 40 extends downward along the external side of the manway nozzle extension 20, the internal gasket extension 60 extends downward along the internal side of the manway nozzle extension 20, and the sealing surface contact portion 50 rests upon and abuts the top edge of the manway nozzle extension 10. The tabs 70 extending from the external gasket extension 40 also extends downward along the external side of the manway nozzle extension 20.

Figure 5A:
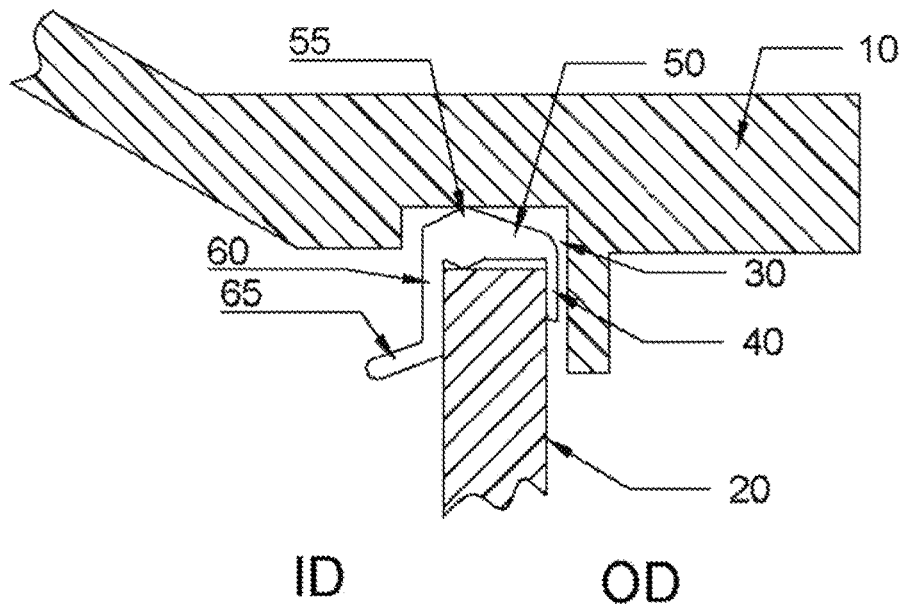
FIG. 5A is a partial cross-sectional view of the railroad tank car manway nozzle assembly gasket of the present disclosure in place on a railroad tank car manway nozzle, in an uncompressed state.
Figure 5B:
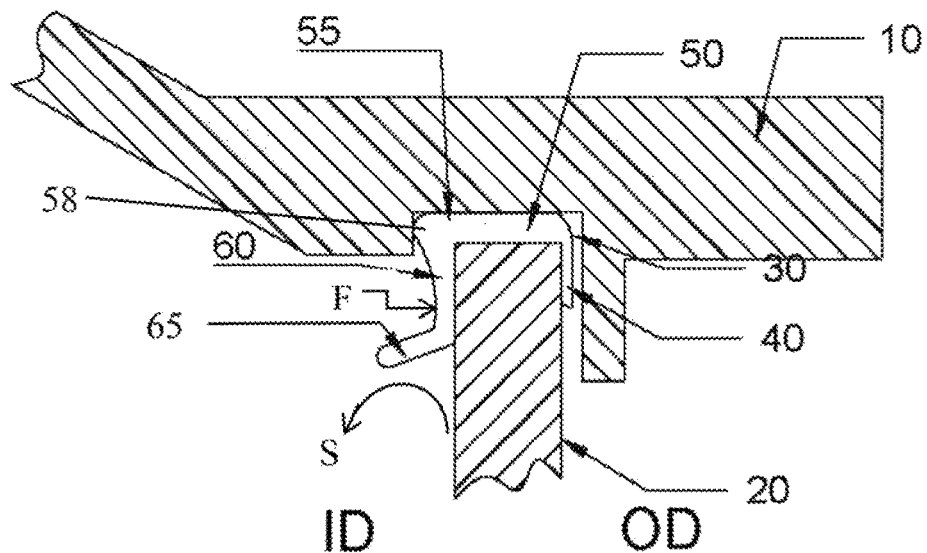
FIG. 5B is a partial cross-sectional view of the railroad tank car manway nozzle assembly gasket of the present disclosure in place on a railroad tank car manway nozzle, in a compressed state.

FIGS. 5A-5B illustrate a preferred embodiment of the gasket, in its free uncompressed assembly state (FIG. 5A), and then in its compressed assembly state (FIG. 5B). The gasket 30 is assembled between the manway cover plate 10 and the manway nozzle extension 20 providing the required sealing contact surface, with top surface of the sealing surface contact portion 50 abutting the manway cover plate 10 when in its compressed assembly state (FIG. 5B), and the bottom surface of the sealing surface contact portion 50 abutting the manway nozzle extension 20 when in its compressed assembly state (FIG. 5B).

The external gasket extension 40 is designed to provide a gripping force on the external surface of the nozzle wall itself, along its outside diameter (OD), to help keep the gasket in place, as well as preferably providing up to four tabs 70 located at equal distance to provide a method of securing the gasket at the time of placement when required. The internal gasket extension 60 is designed to provide a gripping force on the internal surface of the nozzle wall itself, along its inside diameter (ID) to help keep the gasket in place and prevent leakage of the fluid from the manway nozzle 20. The internal gasket extension 60 is also designed to provide a splash guard or ring portion 65 angled such to redirect potential fluid splash back down and away from the internal nozzle surface, in the direction illustrated by arrow S.

The sealing surface contact portion 50 is designed to provide the maximum sealing contact forces at the time the manway cover plate 10 is bolted down and torqued to the nozzle. The sealing surface contact portion 50 is designed to incorporate additional material or an enlarged mass portion 55 that will extrude or move with the compressive force of the assembly, moving from its uncompressed FIG. 5A enlarged mass shape to is compressed FIG. 5B flat and extended shape, extending leftward (as illustrated) forming a bulging portion 58 at the inner diameter (ID) of the nozzle 20, to force the internal gasket extension 60 downward and inward against the internal wall of the nozzle 20 itself, thereby providing an additional or extra sealing force F against the internal side of the nozzle 20, and preventing the fluid from potentially leaking.

Figure 6:
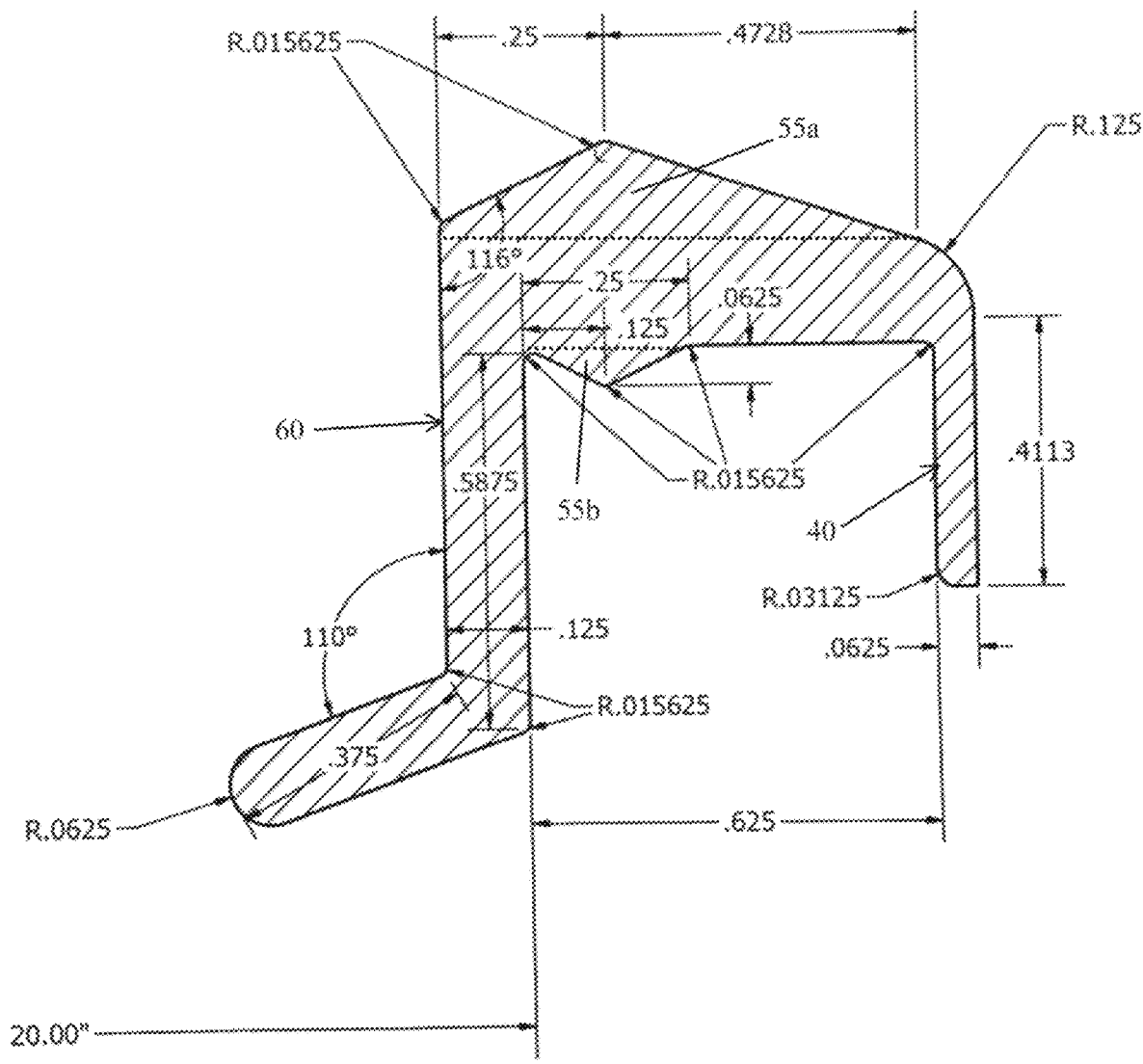
FIG. 6 is an enlarged view of the partial cross-sectional view of the railroad tank car manway nozzle assembly gasket of FIG. 5A.

FIG. 6 illustrates a preferred shape of the cross section of the gasket as illustrated in FIG. 5A. Specifically, in its uncompressed state, the enlarged mass portion has both an upper mass portion 55a and a lower mass portion 55b along a longitudinal axis of the sealing surface contact portion 50. In a preferred embodiment, the lower mass portion 55b extends from the right side (as illustrated) of the internal gasket extension 60 towards the external gasket extension 40 for approximately 0.25 inches. The lower mass portion 55b is generally triangular shape (base shown in phantom by a dotted line), and preferably shaped like an isosceles triangle, having a peak height of approximately 0.0625 inches. In a preferred embodiment, the upper mass portion 55a extends from the left side (as illustrated) of the internal gasket extension 60 to approximately the left side (as illustrated) of the external gasket extension 40 for approximately 0.7228 inches. The upper mass portion 55a is generally shaped as a quadrilateral (base shown in phantom by a dotted line), with a short vertical side extending upward from the left side (as illustrated) of the internal gasket extension 60, perpendicular to the base, an ascending side extending upward at an angle of approximately 26° from the top of the short vertical side for approximately 0.25 linear inches, and a descending side forming a peak with the ascending side, and descending at an angle back to the base for approximately 0.4728 linear inches.

It should be understood that the size and/or shape of the enlarged mass portion 55 and either or both of the upper mass portion 55a and the lower mass portion 55b can vary without departing from the teachings herein. For example, the upper mass portion can be larger than shown, while the lower mass portion can be smaller than shown or even eliminated in some applications. Conversely, the lower mass portion can be larger than shown, while the upper mass portion can be smaller than shown. However, in order for the rubber flow under compression to create the mechanical loading of the inner seal to hug the inside portion of the nozzle, the upper mass portion must be larger than the lower mass portion. The shape of the upper mass portion and/or the lower mass portion can also vary without departing from the teachings herein. For example, the shape of one or both portions may be generally triangular, quadrilateral, trapezoidal, semi-circular, semi-elliptical, or may resemble the shape of an airfoil or half airfoil or other suitable shape that will perform according to the teachings herein. Additionally, the center of the upper mass portion can be moved or slightly offset toward the ID of the gasket to create an even greater force F for the internal gasket extension 60 and splash lip 65, to prevent fluid flow from moving up the nozzle wall and toward the seal face against the nozzle top.

While the embodiment(s) disclosed herein are illustrative of the structure, function and operation of the exemplary method(s), system(s) and device(s), it should be understood that various modifications may be made thereto with departing from the teachings herein. Further, the components of the method(s), system(s) and device(s) disclosed herein can take any suitable form, including any suitable material or other components capable of adequately performing their respective intended functions, as may be known in the art.

While the foregoing discussion presents the teachings in an exemplary fashion with respect to the disclosed method(s), system(s) and device(s) for providing a seal between a manway nozzle and cover plate on a railroad tank car, it will be apparent to those skilled in the art that the present disclosure may apply to other method(s), system(s) and device(s) utilizing the disclosed gasket technologies. Further, while the foregoing has described what are considered to be the best mode and/or other examples, it is understood that various modifications may be made therein and that the subject matter disclosed herein may be implemented in various forms and examples, and that the method(s), system(s) and device(s) may be applied in numerous applications, only some of which have been described herein.

What is claimed is:

1. A gasket for sealing around a railroad tank car manway nozzle having an exterior portion, an end surface, and an interior portion, the gasket comprising:
   a first portion defining an external gasket extension for overlapping an external portion of the manway nozzle;
   a second portion defining a sealing surface contact portion for overlapping an end surface of the manway nozzle; and
   a third portion defining an internal gasket extension for overlapping an internal portion of the manway nozzle;
   wherein the third portion includes a ring portion extending at an angle from the internal gasket extension.

2. The gasket of claim 1, wherein the sealing surface contact portion includes an enlarged mass portion having an upper mass portion and a lower mass portion, wherein the upper mass portion is larger than the lower mass portion.

3. The gasket of claim 2, wherein the enlarged mass portion has a flattened shape and an extended shape under compression, wherein the extended shape extends inward of the interior portion of the manway nozzle.

4. The gasket of claim 1, further comprising at least one tab on the external gasket extension, wherein the at least one tab has a grommet, and wherein the at least one tab serves as an identification.

5. The gasket of claim 1, where the ring portion forms an internal splash guard.

6. A railroad tank car manway nozzle assembly gasket for sealing between a manway nozzle having an exterior portion, an end surface, and an interior portion, and a manway cover plate of a railroad tank car, the gasket comprising:
   an external gasket extension extending downward along an exterior wall of the manway nozzle;
   an internal gasket extension extending downward along an interior wall of the manway nozzle, wherein the internal gasket extension includes a ring portion extending at an angle from the internal gasket extension; and
   a sealing surface contact portion between the external gasket extension and the internal gasket extension, and extending across a top edge of the manway nozzle.

7. The gasket of claim 2, further comprising a plurality of tabs on the external gasket extension, wherein at least one of the plurality of tabs includes a grommet, and wherein at least one tab serves as an identification.

8. The gasket of claim 2, wherein the sealing surface contact portion includes an enlarged mass portion having an upper mass portion and a lower mass portion, wherein the upper mass portion is larger than the lower mass portion.

9. The gasket of claim 8, wherein the enlarged mass portion has a flattened shape and an extended shape under compression to provide an additional sealing force along the interior wall of the manway nozzle, wherein the extended shape extends inward of the interior portion of the manway nozzle.

10. The gasket of claim 6, where the ring portion forms an internal splash guard.

11. A method of sealing between a manway nozzle having an exterior portion, an end surface, and an interior portion, and manway cover plate of a railroad tank car, comprising the steps of:
   unbolting the manway cover plate;
   removing an existing nozzle gasket;
   replacing the existing nozzle gasket with a new gasket having an external gasket extension, a sealing surface contact portion, an internal gasket extension and an angled ring portion on the internal gasket extension to form an internal splash guard along an interior wall of the manway nozzle; and
   bolting and torqueing down the cover plate to the nozzle.

12. The method of claim 11, further comprising the step of providing at least one tab having a grommet on the external gasket extension, and using the at least one tab as an identification.

13. The method of claim 12, further comprising the step of tying the gasket to the cover plate via the grommet.

14. The method of claim 11, further comprising the step of providing an enlarged mass portion in the sealing surface contact portion, the enlarged mass portion having an upper mass portion and a lower mass portion, wherein the upper mass portion is larger than the lower mass portion.

15. The method of claim 14, further comprising the step of compressing the sealing surface contact portion to flatten and extend the enlarged mass portion inward of the interior portion of the manway nozzle to provide an additional sealing force along an interior wall of the manway nozzle.

* * * * *